US 12,453,930 B2

United States Patent
Thomas

(10) Patent No.: US 12,453,930 B2
(45) Date of Patent: Oct. 28, 2025

(54) PRODUCTS AND METHODS RELATED TO THE DISTILLATION OF MOLECULES FROM AEROSOLS

(71) Applicant: NATURAL EXTRACTION SYSTEMS, LLC, Boulder, CO (US)

(72) Inventor: C. Russell Thomas, Boulder, CO (US)

(73) Assignee: Natural Extraction Systems, LLC, Boulder, CO (US)

( * ) Notice: Subject to any disclaimer, the term of this patent is extended or adjusted under 35 U.S.C. 154(b) by 0 days.

(21) Appl. No.: 18/553,175

(22) PCT Filed: Apr. 1, 2022

(86) PCT No.: PCT/US2022/023159
§ 371 (c)(1),
(2) Date: Sep. 28, 2023

(87) PCT Pub. No.: WO2022/212912
PCT Pub. Date: Oct. 6, 2022

(65) Prior Publication Data
US 2024/0181369 A1 Jun. 6, 2024

Related U.S. Application Data

(60) Provisional application No. 63/250,861, filed on Sep. 30, 2021, provisional application No. 63/250,916, filed on Sep. 30, 2021, provisional application No. 63/173,195, filed on Apr. 9, 2021, provisional application No. 63/170,306, filed on Apr. 2, 2021.

(51) Int. Cl.
| | |
|---|---|
| B01D 11/02 | (2006.01) |
| B01D 3/30 | (2006.01) |
| B01D 3/34 | (2006.01) |
| B01D 3/42 | (2006.01) |
| C07C 45/78 | (2006.01) |
| C07C 45/81 | (2006.01) |
| C07C 45/82 | (2006.01) |
| C07C 47/58 | (2006.01) |
| B01D 11/00 | (2006.01) |

(52) U.S. Cl.
CPC .............. *B01D 3/346* (2013.01); *B01D 3/30* (2013.01); *B01D 3/42* (2013.01); *B01D 11/02* (2013.01); *C07C 45/78* (2013.01); *C07C 45/81* (2013.01); *C07C 47/58* (2013.01); *B01D 2011/007* (2013.01); *C07C 45/82* (2013.01)

(58) Field of Classification Search
CPC .... B01D 2011/007; B01D 11/02–0296; C07C 47/58; C07C 45/78–86
See application file for complete search history.

(56) References Cited

U.S. PATENT DOCUMENTS

| | | | | |
|---|---|---|---|---|
| 2,347,322 A | * | 4/1944 | Jackson | A61K 36/898 426/489 |
| 2,820,744 A | * | 1/1958 | Lighter | C02F 1/18 203/DIG. 1 |
| 3,969,196 A | * | 7/1976 | Zosel | C11B 1/104 568/918 |
| 4,198,432 A | * | 4/1980 | Vitzthum | A23L 27/11 426/318 |
| 10,159,908 B2 | | 12/2018 | Thomas | |
| 10,617,974 B2 | | 4/2020 | Thomas | |
| 10,669,248 B2 | | 6/2020 | Thomas et al. | |
| 11,021,674 B2 | | 6/2021 | Thomas | |
| 2007/0000769 A1 | | 1/2007 | Brown | |
| 2010/0137652 A1 | | 6/2010 | Tirtowidjojo | |
| 2015/0239828 A1 | | 8/2015 | Gajda et al. | |
| 2015/0352463 A1 | | 12/2015 | Grave et al. | |
| 2016/0250564 A1 | * | 9/2016 | Thomas | C11B 9/027 554/8 |
| 2018/0078874 A1 | | 3/2018 | Thomas | |
| 2022/0280444 A1 | | 9/2022 | Thomas | |
| 2023/0076088 A1 | * | 3/2023 | Thomas | C07D 311/80 |

FOREIGN PATENT DOCUMENTS

WO 2021159088 A1 8/2021

OTHER PUBLICATIONS

Z.N. Akhlisah, R. Yunus, Z.Z. Abidin, B.Y. Lim, D. Kania, "Pretreatment methods for an effective conversion of oil palm biomass into sugars and high-value chemicals", Biomass and Bioenergy, vol. 144, 2021, 105901, ISSN 0961-9534, https://doi.org/10.1016/j.biombioe.2020.105901.*

Wu et al., "Improved Alkaline Oxidation Process for the Production of Aldehydes (Vanillin and Syringaldehyde) from Steam-Explosion Hardwood Lignin", Industrial & Engineering Chemistry Research, Mar. 1, 1994, vol. 33, Issue 3, 718-723, https://doi.org/10.1021/ie00027a034.*

* cited by examiner

*Primary Examiner* — Jonathan Luke Pilcher
(74) *Attorney, Agent, or Firm* — Douglas G. Metcalf

(57) ABSTRACT

Various aspects of this disclosure relate to the discovery that converting a solid or a liquid into an aerosol allows the distillation of molecules from the aerosol in seconds at temperatures that are significantly less than the boiling points of the molecules. Various aspects of this disclosure relate to the discovery that mute plants can be extracted at both ambient temperatures and temperatures significantly less than the boiling points of the volatile molecules of the mute plants by capturing the volatile molecules in a solvent such as ethanol.

19 Claims, No Drawings

PRODUCTS AND METHODS RELATED TO THE DISTILLATION OF MOLECULES FROM AEROSOLS

CROSS-REFERENCE TO RELATED APPLICATIONS

This is a national phase application of International Application No. PCT/US2022/023159, filed Apr. 1, 2022, which claims priority to U.S. Provisional Patent Application No. 63/170,306, filed Apr. 2, 2021; U.S. Provisional Patent Application No. 63/173,195, filed Apr. 9, 2021; U.S. Provisional Patent Application No. 63/250,861, filed Sep. 30, 2021; and U.S. Provisional Patent Application No. 63/250,916, filed Sep. 30, 2021, each of which is incorporated by reference in its entirety.

BACKGROUND

Natural product extraction is a mature technical field. An oligopoly of a few major flavor and fragrance companies achieved economies of scale and global footprints. Their products became commoditized and fungible, which forced cost-cutting and tight profit margins.

Many "current good manufacturing practices" utilize chemicals now known to present health risks and labor practices that draw an uncomfortable line between acceptable and exploitative. Regulators and customers increasingly pressure the ingredients industries, and newsworthy publications suggest that new regulations may inadvertently end the economically-viable production of several key ingredients used in everyday consumer packaged goods.

A new extraction technology that could increase profit margins without reliance upon disfavored solvents could allow flavor and fragrance companies to absorb the cost of additional regulation and save the global supply of ingredients that currently require manufacturing methods that may not remain tenable in the years to come.

SUMMARY

Various aspects of this disclosure relate to the discovery that converting a solid or a liquid into an aerosol allows the distillation of molecules from the aerosol in seconds at temperatures that are significantly less than the boiling points of the molecules. This discovery extends beyond aerosols to many compositions that have large surface-area-to-volume ratios.

Various aspects of this disclosure relate to the discovery that mute plants, which were historically resistant to extraction and include, for example, lily of the valley, can be extracted at both ambient temperatures and temperatures significantly less than the boiling points of the volatile molecules of the mute plants by capturing the volatile molecules in a solvent such as ethanol. Such extractions are commercially viable, for example, by recirculating a gas through a first chamber that contains biomass of the mute plant and a second chamber that contains the solvent. This discovery extends beyond mute plants to other compositions that comprise volatile molecules.

DETAILED DESCRIPTION

Various aspects of this disclosure relate to a method to separate a molecule from an impurity, comprising: providing a composition comprising the molecule and the impurity, wherein the molecule is present in the composition in a solid phase or a liquid phase, and the impurity is present in the composition in a solid phase or a liquid phase; converting the molecule into a vaporized molecule in a gas phase, wherein the gas phase has a pressure and a temperature, the molecule has a boiling point at the pressure and a vapor pressure at the temperature, the pressure of the gas phase is greater than the vapor pressure of the molecule, the boiling point of the molecule is greater than the temperature of the gas phase, and either the impurity lacks a vapor pressure or the impurity has a vapor pressure at the temperature that is less than the vapor pressure of the molecule at the temperature; separating the vaporized molecule from the impurity; and condensing the vaporized molecule into a condensed molecule. The precise nature of a distillation apparatus configured to perform a method of this disclosure is not particularly limiting, and the methods of this disclosure may be performed, for example, in a system described in European Patent No. 3,283,606 B1.

"Comprising" refers to an open set, for example, such that a method comprising a number of disclosed steps can also comprise additional undisclosed steps.

In some embodiments, the method comprises bombarding the composition with at least 10 sextillion molecules of a sweep gas per gram of the composition. In some specific embodiments, the method comprises bombarding the composition with at least 10 sextillion molecules of a sweep gas per gram of the composition per second.

In some embodiments, the method comprises bombarding the composition with at least 1 liter of a sweep gas per gram of the composition. In some specific embodiments, the method comprises bombarding the composition with at least 1 liter of a sweep gas per gram of the composition per second.

In some embodiments, the method comprises bombarding the composition with a sweep gas at a force of at least 10 millinewtons per gram of the composition. In some specific embodiments, the method comprises bombarding the composition with a sweep gas with an impulse of at least 10 millinewton-seconds per gram of the composition.

In some embodiments, the method comprises bombarding the composition with a sweep gas that has a kinetic energy of at least 1 millijoule per gram of the composition.

In some embodiments, the method comprises bombarding the composition with a sweep gas that has a velocity of at least 100 millimeters per second.

In some embodiments, the method comprises bombarding the composition with a sweep gas for no greater than 60 seconds. In some specific embodiments, the method comprises bombarding the composition with a sweep gas for at least 100 milliseconds and no greater than 10 seconds.

In some embodiments, the composition off-gasses the vaporized molecule at a vaporization rate; the vaporized molecule recondenses onto the composition at a condensation rate; converting the molecule into the vaporized molecule occurs at a mass transfer rate, which is equal to the vaporization rate minus the condensation rate; and the bombarding increases the mass transfer rate.

In some embodiments, the bombarding decreases the condensation rate.

In some embodiments, the bombarding increases the vaporization rate. In some specific embodiments, the bombarding increases the vaporization rate to at least 5 micrograms of the molecule per gram of the composition per second.

In some embodiments, the bombarding increases the mass transfer rate to at least 5 micrograms of the molecule per gram of the composition per second.

In some embodiments, the vaporized molecule has a partial pressure at the surface of the composition; and the bombarding decreases the partial pressure of the vaporized molecule at the surface of the composition.

In some embodiments, the vaporized molecule has a partial pressure at the surface of the composition; the vaporized molecule recondenses onto the composition at a condensation rate; decreasing the partial pressure of the vaporized molecule at the surface of the composition decreases the condensation rate; and the bombarding both decreases the partial pressure of the vaporized molecule at the surface of the composition and decreases the condensation rate.

In some embodiments, the vaporized molecule has a partial pressure at the surface of the composition; the composition off-gasses the vaporized molecule at a vaporization rate; the vaporized molecule recondenses onto the composition at a condensation rate; converting the molecule into the vaporized molecule occurs at a mass transfer rate, which is equal to the vaporization rate minus the condensation rate; decreasing the partial pressure of the vaporized molecule at the surface of the composition increases the mass transfer rate; and the bombarding both decreases the partial pressure of the vaporized molecule at the surface of the composition and increases the mass transfer rate.

In some embodiments, the vaporized molecule has a partial pressure in the gas phase; the partial pressure of the vaporized molecule has concentration gradients in the gas phase; the concentration gradients have magnitudes; and the bombarding decreases the magnitudes of the concentration gradients.

In some embodiments, the vaporized molecule has a partial pressure in the gas phase; the partial pressure of the vaporized molecule in the gas phase inversely correlates with distance from the composition; and the bombarding decreases the inverse correlation.

In some embodiments, the vaporized molecule has a partial pressure in the gas phase; the partial pressure of the vaporized molecule in the gas phase inversely correlates with distance from the composition; the inverse correlation has a magnitude; and the bombarding decreases the magnitude of the inverse correlation.

In some embodiments, the vaporized molecule has a partial pressure in the gas phase; the partial pressure of the vaporized molecule in the gas phase inversely correlates with distance from the composition; the inverse correlation has a correlation coefficient of at least −1 and less than 0, wherein −1 is complete inverse correlation and 0 is no correlation; the correlation coefficient has an absolute value; and the bombarding decreases the absolute value of the correlation coefficient.

In some embodiments, the bombarding performs work on the vaporized molecule. In some specific embodiments, the bombarding performs work on the vaporized molecule that translates the vaporized molecule in three-dimensional space. In some very specific embodiments, the bombarding performs work on the vaporized molecule that translates the vaporized molecule by at least 1 meter.

In some embodiments, the bombarding transfers kinetic energy to the vaporized molecule. In some specific embodiments, the bombarding transfers at least 10 microjoules of kinetic energy to the vaporized molecule per gram of the vaporized molecule.

In some embodiments, the bombarding accelerates the vaporized molecule. In some specific embodiments, the bombarding accelerates the vaporized molecule to an average velocity of at least 100 millimeters per second.

In some embodiments, the bombarding increases the vapor pressure of the molecule. In some specific embodiments, the composition off-gasses the vaporized molecule at a vaporization rate; increasing the vapor pressure of the molecule increases the vaporization rate; and the bombarding both increases the vapor pressure of the molecule and increases the vaporization rate. In some very specific embodiments, the bombarding increases the vaporization rate to at least 5 micrograms of the molecule per gram of the composition per second.

In some embodiments, the composition off-gasses the vaporized molecule at a vaporization rate; the vaporized molecule recondenses onto the composition at a condensation rate; converting the molecule into the vaporized molecule occurs at a mass transfer rate, which is equal to the vaporization rate minus the condensation rate; increasing the vapor pressure of the molecule increases the mass transfer rate; and the bombarding both increases the vapor pressure of the molecule and increases the mass transfer rate. In some specific embodiments, the bombarding increases the mass transfer rate to at least 5 micrograms of the molecule per gram of the composition per second.

In some embodiments, the composition has thermal energy; the bombarding increases the thermal energy of the composition; and increasing the thermal energy of the composition increases the vapor pressure of the molecule.

In some embodiments, increasing the vapor pressure of the molecule comprises sensible heat transfer from the gas phase to the composition; the sensible heat transfer has a rate; and the bombarding increases the rate of the sensible heat transfer. In some specific embodiments, the sensible heat transfer from the gas phase to the composition is completed in less than 60 seconds.

In some embodiments, converting the molecule into the vaporized molecule comprises latent heat transfer between the composition and the gas phase; the latent heat transfer has a rate; and the bombarding increases the rate of the latent heat transfer. In some specific embodiments, the latent heat transfer between the composition and the gas phase is completed in less than 60 seconds.

In some embodiments, the bombarding suspends at least 75 percent of the composition in the gas phase. In some specific embodiments, the bombarding suspends at least 98 percent of the composition in the gas phase.

In some embodiments, the bombarding performs work on the composition. In some specific embodiments, the bombarding performs work on the composition that translates at least 90 percent of the composition. In some very specific embodiments, the bombarding performs work on the composition that translates at least 90 percent of the composition by at least 1 meter.

In some embodiments, the bombarding transfers kinetic energy to the composition. In some specific embodiments, the bombarding transfers at least 10 microjoules of kinetic energy to the composition per gram of the composition.

In some embodiments, the bombarding accelerates the composition. In some specific embodiments, the bombarding accelerates at least 90 percent of the composition to an average velocity that is greater than 100 millimeters per second.

In some embodiments, the method comprises sensible heat transfer from the gas phase to the composition, wherein the sensible heat transfer has a rate; and the bombarding increases the rate of the sensible heat transfer.

In some embodiments, the composition has a temperature that is less than the temperature of the gas phase when the composition is provided; the method comprises heating the composition; and the bombarding heats the composition. In some specific embodiments, the composition has a temperature of no greater than 100 degrees Celsius when the composition is provided; the method comprises heating the composition to a temperature greater than 100 degrees Celsius; and the bombarding heats the composition. In some very specific embodiments, the composition has a temperature of at least 15 degrees Celsius and no greater than 100 degrees Celsius when the composition is provided; the method comprises heating the composition to a temperature greater than 100 degrees Celsius; and the bombarding heats the composition.

In some embodiments, the bombarding performs work that separates the vaporized molecule from the impurity.

In some embodiments, the bombarding propels the vaporized molecule through a cyclone or centrifugal separator that separates the vaporized molecule from the impurity.

In some embodiments, the bombarding propels the impurity through a cyclone or centrifugal separator that separates the vaporized molecule from the impurity.

In some embodiments, the bombarding propels the vaporized molecule through a filter that separates the vaporized molecule from the impurity.

In some embodiments, the method comprises providing a system, wherein converting the molecule into the vaporized molecule is performed in a first chamber of the system; condensing the vaporized molecule into the condensed molecule is performed in a second chamber of the system; and the bombarding propels the vaporized molecule from the first chamber of the system to the second chamber of the system.

In some embodiments, the bombarding propels the vaporized molecule to a compressor that condenses the vaporized molecule into the condensed molecule.

In some embodiments, the bombarding propels the vaporized molecule to a heat sink that condenses the vaporized molecule into the condensed molecule.

In some embodiments, the sweep gas comprises one or more of molecular nitrogen, molecular oxygen, carbon dioxide, argon, neon, water vapor, and ethanol vapor. In some specific embodiments, the sweep gas comprises one or more of molecular nitrogen, molecular oxygen, carbon dioxide, argon, neon, water vapor, and ethanol vapor at a combined concentration of at least 50 percent by mass. In some very specific embodiments, the sweep gas consists of one or more of molecular nitrogen, molecular oxygen, carbon dioxide, argon, neon, water vapor, and ethanol vapor.

"Consists of" refers to a closed set, for example, such that a sweep gas that consists of one or more disclosed molecules cannot also comprise undisclosed molecules. The skilled person nevertheless understands that impurities might be present at detectable, trace concentrations in the real-world practice of the inventions of this disclosure, and the term "consists of" allows for the presence of undisclosed impurities in a sweep gas that "consists of" one or more disclosed molecules when both (i) the undisclosed impurities are present at lower concentrations than the disclosed molecules and (ii) the undisclosed impurities do not affect the practice of the methods of the disclosure.

In some embodiments, the sweep gas comprises molecular nitrogen at a concentration of at least 50 percent by mass.

In some embodiments, the sweep gas comprises steam at a concentration of at least 50 percent by mass. In some specific embodiments, the sweep gas consists of steam.

In some embodiments, the sweep gas has a Reynolds number of at least 1 during the bombarding.

In some embodiments, the sweep gas has a Reynolds number of no greater than 100,000 during the bombarding.

In some embodiments, the composition has a drag coefficient of at least 0.5 when the composition is bombarded with the sweep gas.

In some embodiments, the method comprises processing a starting composition to increase its surface-area-to-volume ratio, wherein providing the composition comprises the processing. In some specific embodiments, the composition off-gasses the vaporized molecule at a vaporization rate; a greater surface-area-to-volume ratio correlates with a greater vaporization rate; providing the composition comprises preparing the composition from a starting composition; the starting composition has a surface-area-to-volume ratio that is less than the surface-area-to-volume ratio of the composition; and the processing comprises one or both of increasing the surface-area-to-volume ratio of the starting composition and selecting a portion of the starting composition that has a greater surface-area-to-volume ratio than the rest of the starting composition.

In some embodiments, providing the composition comprises one or both of grinding a starting composition and separating the starting composition by size.

In some embodiments, providing the composition comprises selecting particles of a starting composition that have a particle size of no greater than 5 millimeters.

"Particle size" refers to the longest linear distance that connects one point of a particle of the composition to another point of the particle in three-dimensional Euclidean space.

In some embodiments, providing the composition comprises grinding a starting composition to an average particle size that is no greater than 5 millimeters.

In some embodiments, the composition off-gasses the vaporized molecule at a vaporization rate; and the surface-area-to-volume ratio of the composition supports a vaporization rate of at least 5 micrograms of the molecule per gram of the composition per second at the temperature and the pressure of the gas phase.

In some embodiments, the composition off-gasses the vaporized molecule at a vaporization rate; the vaporized molecule recondenses onto the composition at a condensation rate; converting the molecule into the vaporized molecule occurs at a mass transfer rate, which is equal to the vaporization rate minus the condensation rate; and the surface-area-to-volume ratio of the composition supports a mass transfer rate of at least 5 micrograms of the molecule per gram of the composition per second at the temperature and the pressure of the gas phase.

In some embodiments, the composition has a surface-area-to-volume ratio that is greater than 500 per meter. In some specific embodiments, the composition has a surface-area-to-volume ratio of at least 2400 per meter.

In some embodiments, the composition comprises flowers, flower petals, or partially-processed flowers; and the composition has a surface-area-to-volume ratio that is less than 500 per meter.

In some embodiments, the composition has an average terminal velocity of no greater than 5 meters per second in still, dry air at 1 atmosphere of pressure.

In some embodiments, providing the composition comprises selecting a portion of a starting composition that has a terminal velocity of no greater than 5 meters per second in still, dry air at 1 atmosphere of pressure.

In some embodiments, the method comprises suspending at least 75 percent of the composition in the gas phase. In some specific embodiments, the method comprises suspending at least 98 percent of the composition in the gas phase.

In some embodiments, the composition is not suspended in the gas phase when the molecule is converted into the vaporized molecule.

In some embodiments, the impurity is a monosaccharide, disaccharide, or polysaccharide. In some specific embodiments, the impurity is cellulose I.

In some embodiments, the impurity is an amino acid, polypeptide, or protein.

In some embodiments, the impurity is a nucleobase, nucleoside, nucleotide, or nucleic acid.

In some embodiments, the impurity is a triglyceride.

In some embodiments, the impurity is chlorophyll.

In some embodiments, the impurity is sodium ion, potassium ion, calcium ion, iron(II), iron(III), magnesium ion, or phosphate.

In some embodiments, the composition comprises biological cells; the biological cells have interiors, exteriors, and cell membranes that separate the interiors from the exteriors; and the method comprises generating sufficient pressure within the biological cells to rupture at least 10 percent of the cell membranes. Rupturing cell membranes improves extraction by facilitating fluid communication between the interiors and the gas phase.

In some embodiments, the composition comprises biological cells; the biological cells have interiors, exteriors, and cell membranes that separate the interiors from the exteriors; the method comprises vaporizing an accessory molecule within the biological cells; and vaporizing the accessory molecule generates sufficient pressure within the biological cells to rupture at least 10 percent of the cell membranes.

In some embodiments, the composition comprises biological cells; the biological cells have interiors, exteriors, and cell membranes that separate the interiors from the exteriors; and the method comprises vaporizing an accessory molecule within the biological cells at a rate sufficient to generate pressure within the biological cells that ruptures at least 10 percent of the cell membranes.

In some embodiments, the method comprises vaporizing the accessory molecule and rupturing the cell membranes in a total time of no greater than 60 seconds.

In some embodiments, the composition comprises the accessory molecule at a concentration of at least 1000 parts per million by mass.

In some embodiments, the composition comprises the accessory molecule at a concentration of no greater than 20 percent by mass.

In some embodiments, the accessory molecule is water.

In some embodiments, the method comprises generating sufficient pressure within the biological cells to rupture at least 75 percent of the cell membranes.

In some embodiments, the composition off-gasses the vaporized molecule at a vaporization rate; and the rupturing increases the vaporization rate.

In some embodiments, rupturing increases the vaporization rate to at least 5 micrograms of the molecule per gram of the composition per second.

In some embodiments, the composition off-gasses the vaporized molecule at a vaporization rate; the vaporized molecule recondenses onto the composition at a condensation rate; converting the molecule into the vaporized molecule occurs at a mass transfer rate, which is equal to the vaporization rate minus the condensation rate; and the rupturing increases the mass transfer rate. In some specific embodiments, the rupturing increases the mass transfer rate to at least 5 micrograms of the molecule per gram of the composition per second.

In some embodiments, the composition comprises the molecule at a concentration of at least 10 parts per million and no greater than 1 percent by mass.

In some embodiments, the boiling point of the molecule at the pressure of the gas phase is at least 10 percent greater than the boiling point of water in Celsius at the pressure of the gas phase.

In some embodiments, the boiling point of the molecule at the pressure of the gas phase is at least 5 percent greater than the temperature of the gas phase in Celsius. In some specific embodiments, the boiling point of the molecule at the pressure of the gas phase is at least 20 percent greater than the temperature of the gas phase in Celsius.

In some embodiments, the boiling point of the molecule at the pressure of the gas phase is greater than 100 degrees Celsius. In some specific embodiments, the boiling point of the molecule at the pressure of the gas phase is greater than 230 degrees Celsius.

In some embodiments, the vapor pressure of the molecule at the temperature of the gas phase is less than the vapor pressure of water at the temperature of the gas phase. In some specific embodiments, the vapor pressure of the molecule at the temperature of the gas phase is no greater than 50 percent of the vapor pressure of water at the temperature of the gas phase.

In some embodiments, the vapor pressure of the molecule at the temperature of the gas phase is no greater than 90 percent of the pressure of the gas phase.

In some embodiments, the vapor pressure of the molecule at the temperature of the gas phase is at least 1 percent of the pressure of the gas phase.

In some embodiments, the temperature of the gas phase is greater than the boiling point of water at the pressure of the gas phase.

In some embodiments, the temperature of the gas phase is less than 250 degrees Celsius.

In some embodiments, the pressure of the gas phase is at least 0.5 atmospheres and no greater than 2 atmospheres.

In some embodiments, the method comprises converting at least 10 percent of the molecule into the condensed molecule by mole. In some specific embodiments, the method comprises converting at least 60 percent of the molecule into the condensed molecule by mole.

In some embodiments, the composition comprises a starting ratio of the molecule to the impurity by mass; condensing the vaporized molecule into a condensed molecule results in a condensed phase that comprises an ending ratio of the molecule to the impurity by mass; and the ending ratio is at least 5 times greater than the starting ratio. In some specific embodiments, the ending ratio is at least 50 times greater than the starting ratio. In some very specific embodiments, the ending ratio is at least 500 times greater than the starting ratio.

In some embodiments, condensing the vaporized molecule into a condensed molecule comprises increasing the pressure of the gas phase, reducing the temperature of the gas phase, or both increasing the pressure of the gas phase and reducing the temperature of the gas phase.

In some embodiments, condensing the vaporized molecule into the condensed molecule comprises contacting the vaporized molecule with a heat sink.

In some embodiments, the method comprises converting the molecule into the vaporized molecule in a system that contains the gas phase, wherein the system is configured to inhibit the gas phase from escaping the system.

In some embodiments, the method comprises providing a system, wherein converting the molecule into the vaporized molecule is performed in a first chamber of the system; and condensing the vaporized molecule into the condensed molecule is performed in a second chamber of the system.

In some embodiments, the system allows passage of the vaporized molecule from the first chamber to the second chamber.

In some embodiments, the system allows passage of the gas phase from the first chamber to the second chamber.

In some embodiments, the system inhibits passage of the impurity from the first chamber to the second chamber.

In some embodiments, the system inhibits passage of the composition from the first chamber to the second chamber.

In some embodiments, the system inhibits passage of solids from the first chamber to the second chamber.

In some embodiments, the system inhibits passage of liquids from the first chamber to the second chamber.

In some embodiments, the system allows passage of gases from the second chamber to the first chamber.

In some embodiments, the method comprises condensing the vaporized molecule into the condensed molecule from a first portion of the composition in the second chamber and concurrently converting the molecule into the vaporized molecule from a subsequent portion of the composition in the first chamber.

In some embodiments, the method comprises feeding the composition into the first chamber of the system at a feed rate, which is the amount of the molecule that is fed into the first chamber per unit time; converting the molecule into the vaporized molecule at a mass transfer rate, which is the amount of the molecule that the composition off-gases minus the amount of the vaporized molecule that recondenses onto the composition per unit time; and condensing the vaporized molecule into the condensed molecule at a collection rate, which is the amount of the vaporized molecule that is condensed into the condensed molecule per unit time, wherein the method is performed such that the collection rate is at least 50 percent and no greater than 100 percent of the mass transfer rate over a period of time; the mass transfer rate is at least 50 percent and no greater than 100 percent of the feed rate over a concurrent period of time; and the period of time is chronologically identical to the concurrent period of time. In some specific embodiments, the period of time and the concurrent period of time are the same 10 second period. In some specific embodiments, the period of time and the concurrent period of time are the same 5 second period. In some specific embodiments, the period of time and the concurrent period of time are the same 1 second period.

In some embodiments, the molecule is not water.

In some embodiments, the molecule is acetophenone (CAS: 98-86-2); alpha-bergamotol (CAS: 88034-74-6); alpha-bisabolol (CAS: 515-69-5); alpha-bisabolol oxide A (CAS: 22567-36-8); alpha-cadinol (CAS: 481-34-5); alpha-curcumene (CAS: 644-30-4); alpha-fenchene (CAS: 471-84-1); alpha-phellandrene (CAS: 99-83-2); alpha-pinene (CAS: 80-56-8); alpha-santalol (CAS: 115-71-9); alpha-terpinene (CAS: 99-86-5); alpha-terpineol (CAS: 98-55-5); alpha-terpinyl acetate (CAS: 80-26-2); alpha-thujene (CAS: 2867-05-2); alpha-thujone (CAS: 546-80-5); alpha-zingiberene (CAS: 495-60-3); azulene (CAS: 275-51-4); benzyl acetate (CAS: 140-11-4); benzyl benzoate (CAS: 120-51-4); bergamotene (CAS: 6895-56-3); beta-bisabolene (CAS: 495-61-4); beta-caryophyllene (CAS: 87-44-5); beta-damascenone (CAS: 23696-85-7); beta-eudesmol (CAS: 473-15-4); beta-farnesene (CAS: 77129-48-7); beta-phellandrene (CAS: 555-10-2); beta-pinene (CAS: 127-91-3); beta-santalol (CAS: 11031-45-1); beta-selinene (CAS: 17066-67-0); beta-sesquiphellandrene (CAS: 20307-83-9); beta-terpinene (CAS: 99-84-3); beta-terpinyl acetate (CAS: 10198-23-9); beta-thujene (CAS: 28634-89-1); beta-thujone (CAS: 1125-12-8); borneol (CAS: 464-45-9); bornyl acetate (CAS: 76-49-3); camphene (CAS: 79-92-5); camphor (CAS: 76-22-2); capsaicin (CAS: 404-86-4); carene (CAS: 13466-78-9); carvacrol (CAS: 499-75-2); carvone (CAS: 99-49-0); caryophyllene oxide (CAS: 1139-30-6); cedrene (CAS: 469-61-4); cedrol (CAS: 77-53-2); chamazulene (CAS: 529-05-5); chavicol (CAS: 501-92-8); cinnamaldehyde (CAS: 104-55-2); citral (CAS: 5392-40-5); citronellal (CAS: 106-23-0); citronellol (CAS: 106-22-9); citronellyl formate (CAS: 105-85-1); curzerene (CAS: 17910-09-7); cyclopentadecanolide (CAS: 106-02-5); decanal (CAS: 112-31-2); delta-guaiene (CAS: 3691-11-0); ethyl cinnamate (CAS: 103-36-6); eugenol (CAS: 97-53-0); farnesene (CAS: 502-61-4); farnesol (CAS: 4602-84-0); furanoeudesma-1,3-diene (CAS: 87605-93-4); furfural (CAS: 98-01-1); furfuryl acetate (CAS: 623-17-6); gamma-decalactone (CAS: 706-14-9); gamma-muurolene (CAS: 30021-74-0); gamma-nonalactone (CAS: 104-61-0); gamma-terpinene (CAS: 99-85-4); gamma-terpinyl acetate (CAS: 10235-63-9); geraniol (CAS: 106-24-1); geranyl acetate (CAS: 105-87-3); germacrene A (CAS: 28387-44-2); germacrene D (CAS: 37839-63-7); guaiacol (CAS: 90-05-1); heneicosane (CAS: 629-94-7); humulene (CAS: 6753-98-6); isoamyl benzoate (CAS: 94-46-2); kessane (CAS: 3321-66-2); limonene (CAS: 6876-12-6); linalool (CAS: 78-70-6); linalool oxide (CAS: 1365-19-1); linalyl acetate (CAS: 115-95-7); menthol (CAS: 89-78-1); menthone (CAS: 89-80-5); methyl cinnamate (CAS: 103-26-4); methyl eugenol (CAS: 93-15-2); methylpyrazine (CAS: 109-08-0); myrcene (CAS: 123-35-3); myristicin (CAS: 607-91-0); neral (CAS: 5392-40-5); nerol (CAS: 106-25-2); nerolidol (CAS: 7212-44-4); nookatone (CAS: 91416-23-8); nootkatin (CAS: 4431-03-2); nootkatol (CAS: 53643-07-5); nootkatone (CAS: 91416-23-8); ocimene (CAS: 7216-56-0); octanal (CAS: 124-13-0); para-cresol (CAS: 106-44-5); para-cymene (CAS: 99-87-6); patchouli alcohol (CAS: 5986-55-0); perillene (CAS: 539-52-6); phenylacetaldehyde (CAS: 122-78-1); phenylacetic acid (CAS: 103-82-2); phenylethyl alcohol (CAS: 60-12-8); phytol (CAS: 150-86-7); sabinene (CAS: 3387-41-5); safrole (CAS: 94-59-7); tau-muurolol (CAS: 19912-62-0); terpinen-4-ol (CAS: 562-74-3); terpinolene (CAS: 586-62-9); thymol (CAS: 89-83-8); valencene (CAS: 4630-07-3); vanillin (CAS: 121-33-5); zingerone (CAS: 122-48-5); zingiberenol (CAS: 58334-55-7); zingiberol (CAS: 6754-68-3); 1,8-cineole (CAS: 470-82-6); 1-phenylethyl acetate (CAS: 93-92-5); 2,6-dimethylpyrazine (CAS: 108-50-9); 2-furanmethanol (CAS: 98-00-0); 2-heptanol (CAS: 543-49-7); 2-heptanone (CAS: 110-43-0); 2-heptyl acetate (CAS: 5921-82-4); 2-methoxy-4-vinylphenol (CAS: 7786-61-0); 2-methyl-3-buten-2-ol (CAS: 115-18-4); 2-methylbutanoic acid (CAS: 116-53-0); 2-nonanone (CAS: 821-55-6); 2-pentanol (CAS: 6032-29-7); 2-pentyl acetate (CAS: 626-38-0); 2-phenylethyl alcohol (CAS: 60-12-8); 2-undecanone (CAS: 112-12-9); 3-methylbutanoic acid (CAS: 503-74-2); 3-phenylpropanoic acid (CAS: 501-52-0); 4-methylguaiacol (CAS: 93-51-6); 5-methylfurfural (CAS: 620-02-0); 6-gingerol (CAS: 23513-14-6); 6-methyl-5-hepten-2-one (CAS: 110-93-0); or 6-shogaol (CAS: 555-66-8).

In some embodiments, the molecule is phenylacetaldehyde oxime (CAS: 7028-48-0).

In some embodiments, the molecule is dihydrofarnesal (CAS: 32480-08-3).

In some embodiments, the composition is not *cannabis*, and the composition lacks any product that was derived from *cannabis*.

"*Cannabis*" refers to plants of the genus *cannabis* and any portion of a plant of the genus *Cannabis*. *Cannabis* includes, for example, marijuana and industrial hemp.

"Any chemical species derived from *cannabis*" includes, for example chemical species that are extracted from *cannabis* and chemical species that are manufactured from *cannabis* such as by decarboxylating a *cannabis* extract comprising one or more cannabinoid carboxylic acids.

In some embodiments, the composition comprises biomass of a perennial plant.

In some embodiments, the composition comprises wood.

In some embodiments, the composition comprises sawdust.

In some embodiments, the composition comprises heartwood.

In some embodiments, the composition comprises coniferous wood. In some specific embodiments, the composition comprises *Araucaria*; hoop pine (*Araucaria cunninghamii*); monkey puzzle tree (*Araucaria araucana*); Paraná pine (*Araucaria angustifolia*); cedar (*Cedrus*); celery-top pine (*Phyllocladus aspleniifolius*); cypress; Arizona cypress (*Cupressus arizonica*); bald cypress (*Taxodium distichum*); alerce (*Fitzroya cupressoides*); Hinoki cypress (*Chamaecyparis obtusa*); Lawson's cypress (*Chamaecyparis lawsoniana*); Mediterranean cypress (*Cupressus sempervirens*); Douglas fir (*Pseudotsuga menziesii*); European yew (*Taxus baccata*); fir (*Abies*); balsam fir (*Abies balsamea*); silver fir (*Abies alba*); noble fir (*Abies procera*); Pacific silver fir (*Abies amabilis*); hemlock (*Tsuga*); eastern hemlock (*Tsuga canadensis*); mountain hemlock (*Tsuga mertensiana*); western hemlock (*Tsuga heterophylla*); Huon pine (*Lagarostrobos franklinii*); kauri (*Agathis australis*); Queensland kauri (*Agathis robusta*); Japanese nutmeg-yew (*Torreya nucifera*); larch (*Larix*); European larch (*Larix decidua*); Japanese larch (*Larix kaempferi*); tamarack (*Larix laricina*); western larch (*Larix occidentalis*); pine (*Pinus*); European black pine (*Pinus nigra*); jack pine (*Pinus banksiana*); lodgepole pine (*Pinus contorta*); Monterey pine (*Pinus radiata*); *Ponderosa* pine (*Pinus ponderosa*); red pine (*Pinus resinosa*); Scots pine (*Pinus sylvestris*); white pine; eastern white pine (*Pinus strobus*); western white pine (*Pinus monticola*); sugar pine (*Pinus lambertiana*); southern yellow pine; loblolly pine (*Pinus taeda*); longleaf pine (*Pinus palustris*); pitch pine (*Pinus rigida*); shortleaf pine (*Pinus echinata*); red cedar; eastern red cedar (*Juniperus virginiana*); western red cedar (*Thuja plicata*); coast redwood (*Sequoia sempervirens*); rimu (*Dacrydium cupressinum*); spruce (*Picea*); Norway spruce (*Picea abies*); black spruce (*Picea mariana*); red spruce (*Picea rubens*); Sitka spruce (*Picea sitchensis*); white spruce (*Picea glauca*); sugi (*Cryptomeria japonica*); white cedar; northern white cedar (*Thuja occidentalis*); Atlantic white cedar (*Chamaecyparis thyoides*); or nootka cypress (*Cupressus nootkatensis*).

In some embodiments, the composition comprises angiosperm wood. In some specific embodiments, the composition comprises abachi (*Triplochiton scleroxylon*); acacia; African padauk (*Pterocarpus soyauxii*); afzelia (*Afzelia africana*); agba (*Gossweilerodendron balsamiferum*); alder (*Alnus*); black alder (*Alnus glutinosa*); red alder (*Alnus rubra*); ash (*Fraxinus*); black ash (*Fraxinus nigra*); blue ash (*Fraxinus quadrangulata*); common ash (*Fraxinus excelsior*); green ash (*Fraxinus pennsylvanica*); Oregon ash (*Fraxinus latifolia*); pumpkin ash (*Fraxinus profunda*); white ash (*Fraxinus americana*); aspen (*Populus*); bigtooth aspen (*Populus gradidentata*); European aspen (*Populus tremula*); quaking aspen (*Populus tremuloides*); Australian red cedar (*Toona ciliata*); ayan (*Distemonanthus benthamianus*); balsa (*Ochroma pyramidale*); basswood; American basswood (*Tilia americana*); white basswood (*Tilia heterophylla*); American beech (*Fagus grandifolia*); birch (*Betula*); gray birch (*Betula populifolia*); black birch (*Betula nigra*); paper birch (*Betula papyrifera*); sweet birch (*Betula lenta*); yellow birch (*Betula alleghaniensis*); silver birch (*Betula pendula*); downy birch (*Betula pubescens*); blackbean (*Castanospermum australe*); blackwood; Australian blackwood (*Acacia melanoxylon*); African blackwood (*Dalbergia melanoxylon*); bloodwood (*Brosimum rubescens*); boxelder (*Acer negundo*); boxwood (*Buxus sempervirens*); Brazilian walnut (*Ocotea porosa*); brazilwood (*Caesalpinia echinata*); buckeye (*Aesculus*); horse-chestnut (*Aesculus hippocastanum*); Ohio buckeye (*Aesculus glabra*); yellow buckeye (*Aesculus flava*); butternut (*Juglans cinerea*); California bay laurel (*Umbellularia californica*); camphor tree (*Cinnamomum camphora*); cape chestnut (*Calodendrum capense*); catalpa (*Catalpa*); Ceylon satinwood (*Chloroxylon swietenia*); cherry (*Prunus*); black cherry (*Prunus serotina*); red cherry (*Prunus pensylvanica*); wild cherry (*Prunus avium*); chestnut (*Castanea*); chestnut (*Castanea sativa*); American chestnut (*Castanea dentata*); coachwood (*Ceratopetalum apetalum*); cocobolo (*Dalbergia retusa*); corkwood (*Leitneria floridana*); cottonwood; eastern cottonwood (*Populus deltoides*); swamp cottonwood (*Populus heterophylla*); cucumbertree (*Magnolia acuminata*); cumaru (*Dipteryx*); dogwood (*Cornus*); flowering dogwood (*Cornus florida*); Pacific dogwood (*Cornus nuttallii*); ebony (*Diospyros*); Andaman marblewood (*Diospyros kurzii*); ebène marbre (*Diospyros melanida*); African ebony (*Diospyros crassiflora*); Ceylon ebony (*Diospyros ebenum*); elm; American elm (*Ulmus americana*); English elm (*Ulmus procera*); rock elm (*Ulmus thomasii*); red elm (*Ulmus rubra*); wych elm (*Ulmus glabra*); eucalyptus; flooded gum (*Eucalyptus grandis*); white mahogany (*Eucalyptus acmenoides*); brown mallet (*Eucalyptus astringens*); southern mahogany (*Eucalyptus botryoides*); river red gum (*Eucalyptus camaldulensis*); karri (*Eucalyptus diversicolor*); blue gum (*Eucalyptus globulus*); rose gum (*Eucalyptus grandis*); york gum (*Eucalyptus loxophleba*); jarrah (*Eucalyptus marginata*); tallowwood (*Eucalyptus microcorys*); grey ironbark (*Eucalyptus paniculata*); blackbutt (*Eucalyptus pilularis*); mountain ash (*Eucalyptus regnans*); Australian oak (*Eucalyptus obliqua*); alpine ash (*Eucalyptus delegatensis*); red mahogany (*Eucalyptus resinifera*); swamp mahogany (*Eucalyptus robusta*); Sydney blue gum (*Eucalyptus saligna*); red ironbark (*Eucalyptus sideroxylon*); redwood (*Eucalyptus transcontinentalis*); Wandoo (*Eucalyptus wandoo*); European crabapple (*Malus sylvestris*); European pear (*Pyrus communis*); tigerwood (*Astronium*); greenheart (*Chlorocardium rodiei*); mpingo (*Dalbergia melanoxylon*); guanandi (*Calophyllum brasiliense*); gum (*Eucalyptus*); gumbo limbo (*Bursera simaruba*); hackberry (*Celtis occidentalis*); hickory (*Carya*); pecan (*Carya illinoinensis*); pignut hickory (*Carya glabra*); shagbark hickory (*Carya ovata*); shellbark hickory (*Carya laciniosa*); hornbeam (*Carpinus*); American hophornbeam (*Ostrya virginiana*); ipê (*Handroanthus*); African teak (*Milicia excelsa*); ironwood; balau (*Shorea*); American hornbeam (*Carpinus caroliniana*); sheoak (*Casuarina equisetifolia*); giant ironwood (*Choricarpia subargentea*); diesel tree (*Copaifera langsdorffii*); Borneo ironwood (*Eusideroxylon zwageri*); lignum vitae; guaiacwood (*Guaiacum officinale*);

holywood (*Guaiacum sanctum*); takian (*Hopea odorata*); black ironwood (*Krugiodendron ferreum*); black ironwood (*Olea*); Lebombo ironwood (*Androstachys johnsonii*); Catalina ironwood (*Lyonothamnus floribundus*); Ceylon ironwood (*Mesua ferrea*); desert ironwood (*Olneya tesota*); Persian ironwood (*Parrotia persica*); Brazilian ironwood (*Caesalpinia ferrea*); yellow lapacho (*Tabebuia serratifolia*); jacarandá-boca-de-sapo (*Jacaranda brasiliana*); jacarandá de Brasil (*Dalbergia nigra*); jatobá (*Hymenaea courbaril*); kingwood (*Dalbergia cearensis*); lacewood; northern silky oak (*Cardwellia sublimis*); American sycamore (*Platanus occidentalis*); London plane (*Platanus×acerifolia*); limba (*Terminalia superba*); locust; black locust (*Robinia pseudoacacia*); honey locust (*Gleditsia triacanthos*); mahogany; genuine mahogany (*Swietenia*); West Indies mahogany (*Swietenia mahagoni*); bigleaf mahogany (*Swietenia macrophylla*); Pacific Coast mahogany (*Swietenia humilis*); African mahogany (*Khaya*); Chinese mahogany (*Toona sinensis*); Australian red cedar (*Toona ciliata*); Philippine mahogany (*Toona calantas*); Indonesian mahogany (*Toona sureni*); sapele (*Entandrophragma cylindricum*); sipo (*Entandrophragma utile*); tiama (*Entandrophragma angolense*); kosipo (*Entandrophragma candollei*); mountain mahogany (*Entandrophragma caudatumi*); Indian mahogany (*Chukrasia velutina*); Spanish Cedar (*Cedrela odorata*); light bosse (*Guarea cedrata*); dark bosse (*Guarea thompsonii*); American muskwood (*Guarea grandifolia*); carapa (*Carapa guianensis*); bead-tree (*Melia azedarach*); maple (*Acer*); hard maple; sugar maple (*Acer saccharum*); black maple (*Acer nigrum*); soft maple; boxelder (*Acer negundo*); red maple (*Acer rubrum*); silver maple (*Acer saccharinum*); European maple; sycamore maple (*Acer pseudoplatanus*); marblewood (*Marmaroxylon racemosum*); marri (*Corymbia calophylla*); meranti (*Shorea*); merbau (*Intsia bijuga*); mopane (*Colophospermum mopane*); oak (*Quercus*); white oak (*Quercus alba*); bur oak (*Quercus macrocarpa*); post oak (*Quercus stellata*); swamp white oak (*Quercus bicolor*); southern live oak (*Quercus virginiana*); swamp chestnut oak (*Quercus michauxii*); chestnut oak (*Quercus prinus*); chinkapin oak (*Quercus muhlenbergii*); canyon live oak (*Quercus chrysolepis*); overcup oak (*Quercus lyrata*); English oak (*Quercus robur*); red oak; northern red oak (*Quercus rubra*); eastern black oak (*Quercus velutina*); laurel oak (*Quercus laurifolia*); southern red oak (*Quercus falcata*); water oak (*Quercus nigra*); willow oak (*Quercus phellos*); Nuttall's oak (*Quercus texana*); okoumé (*Aucoumea klaineana*); olive (*Olea europaea*); pink ivory (*Berchemia zeyheri*); poplar; balsam poplar (*Populus balsamifera*); black poplar (*Populus nigra*); hybrid black poplar (*Populus×canadensis*); purpleheart (*Peltogyne*); Queensland maple (*Flindersia brayleyana*); Queensland walnut (*Endiandra palmerstonii*); ramin (*Gonystylus*); redheart, chakté-coc (*Erythroxylon mexicanum*); sal (*Shorea robusta*); sweetgum (*Liquidambar styraciflua*); sandalwood (*Santalum*); Australian sandalwood (*Santalum spicatum*); Indian sandalwood (*Santalum album*); Hawaiian sandalwood (*Santalum ellipticum, Santalum freycinetianum, Santalum paniculatum, Santalum haleakalae*); *Santalum acuminatum; Santalum yasi; Santalum spicatum*; sassafras (*Sassafras albidum*); southern *sassafras* (*Atherosperma moschatum*); satiné (*Brosimum rubescens*); silky oak (*Grevillea robusta*); silver wattle (*Acacia dealbata*); sourwood (*Oxydendrum arboreum*); Spanish-cedar (*Cedrela odorata*); Spanish elm (*Cordia alliodora*); tamboti (*Spirostachys africana*); teak (*Tectona grandis*); Thailand rosewood (*Dalbergia cochinchinensis*); tupelo (*Nyssa*); black tupelo (*Nyssa sylvatica*); tulip tree (*Liriodendron tulipifera*); turpentine (*Syncarpia glomulifera*); walnut (*Juglans*); Eastern black walnut (*Juglans nigra*); common walnut (*Juglans regia*); wenge (*Millettia laurentii*); panga-panga (*Millettia stuhlmannii*); willow (*Salix*); black willow (*Salix nigra*); cricket-bat willow (*Salix alba Caerulea*); white willow (*Salix alba*); weeping willow (*Salix babylonica*); or zingana (*Microberlinia brazzavillensis*).

In some embodiments, the composition comprises biomass of a mute plant. In some specific embodiments, the mute plant is lily of the valley (*Convallaria*), lilac (*Syringa*), honeysuckle (*Lonicera*), violet (*Violaceae*), seringa (*Philadephaceae*), hyacinth (*Hyacinthus*), or sweet pea (*Lathyrus*). In some very specific embodiments, the composition comprises biomass of lily of the valley.

In some embodiments, condensing the vaporized molecule into a condensed molecule comprises contacting the vaporized molecule with a solvent.

In some embodiments, the condensed molecule is dissolved in a solvent.

In some embodiments, the solvent is ethanol.

In some embodiments, the solvent is water.

In some embodiments, the solvent is propylene glycol.

In some embodiments, the solvent is glycerol.

In some embodiments, the solvent is a triglyceride.

In some embodiments, condensing the vaporized molecule into the condensed molecule comprises condensing a plurality of vaporized molecules that comprises the vaporized molecule into a distillate that comprises the condensed molecule.

Various aspects of this disclosure relate to a distillate produced according to a method described anywhere in the disclosure, wherein the distillate is an essential oil of the composition; and the distillate comprises the condensed molecule.

Various aspects of this disclosure relate to a product manufactured from a distillate described in either of the two preceding paragraphs.

In some embodiments, the product is a beverage. In some specific embodiments, the product is an alcoholic beverage. In some very specific embodiments, the product is a liquor, wine, beer, or cocktail.

In some embodiments, the product is a wine. In some specific embodiments, the product is a chardonnay.

In some embodiments, the product is a liquor. In some specific embodiments, the product is a whiskey.

In some embodiments, the product is a consumer packaged good.

In some embodiments, the product is a flavoring.

In some embodiments, the product is synthetic vanillin.

In some embodiments, the product is a food sauce.

In some embodiments, the product is a food.

In some embodiments, the product is a dietary supplement.

In some embodiments, the product is a fragrance.

In some embodiments, the product is a scented skin care product.

In some embodiments, the product is a perfume.

In some embodiments, the product is an air freshener.

In some embodiments, the product is a cleaning preparation.

In some embodiments, the product is a soap or detergent.

In some embodiments, the product is a scented candle.

Thank you, KB.

What is claimed is:

1. A method to separate a molecule from an impurity, comprising:

providing a system to separate the molecule from the impurity;
providing a composition comprising the molecule and the impurity, wherein the molecule is vanillin, the vanillin is present in the composition in a solid phase or a liquid phase, the impurity is cellulose I, and the impurity is present in the composition in a solid phase or a liquid phase;
converting the molecule into a vaporized molecule in a gas phase, wherein converting the molecule into the vaporized molecule is performed in a first chamber of the system, the gas phase has a pressure and a temperature, the molecule has a boiling point at the pressure and a vapor pressure at the temperature, the pressure of the gas phase is greater than the vapor pressure of the molecule, the boiling point of the molecule is greater than the temperature of the gas phase, and either the impurity lacks a vapor pressure or the impurity has a vapor pressure at the temperature that is less than the vapor pressure of the molecule at the temperature;
separating the vaporized molecule from the impurity; and
condensing the vaporized molecule into a condensed molecule,
wherein:
condensing the vaporized molecule into the condensed molecule is performed in a second chamber of the system;
the system allows passage of the gas phase from the first chamber to the second chamber;
the system inhibits passage of the impurity from the first chamber to the second chamber;
the composition comprises biological cells;
the biological cells have interiors, exteriors, and cell membranes that separate the interiors from the exteriors;
the method comprises vaporizing an accessory molecule within the biological cells at a rate sufficient to generate pressure within the biological cells that ruptures at least 10 percent of the cell membranes;
the composition off-gasses the vaporized molecule at a vaporization rate;
the rupturing increases the vaporization rate;
the vaporized molecule recondenses onto the composition at a condensation rate;
converting the molecule into the vaporized molecule occurs at a mass transfer rate, which is equal to the vaporization rate minus the condensation rate;
the rupturing increases the mass transfer rate;
the composition comprises the accessory molecule at a concentration of at least 1000 parts per million by mass;
the accessory molecule is water; and
the temperature of the gas phase is greater than the boiling point of the water at the pressure of the gas phase.

2. The method as claimed in 1, comprising bombarding the composition with at least 10 sextillion molecules of a sweep gas per gram of the composition.

3. The method as claimed in 1, comprising bombarding the composition with at least 10 sextillion molecules of a sweep gas per gram of the composition per second.

4. The method of claim 1, comprising:
feeding the composition into the first chamber of the system at a feed rate, which is the amount of the molecule that is fed into the first chamber per unit time;
bombarding the composition with at least 10 sextillion molecules of a sweep gas per gram of the composition;
converting the molecule into the vaporized molecule at a mass transfer rate, which is the amount of the molecule that the composition off-gases minus the amount of the vaporized molecule that recondenses onto the composition per unit time; and
condensing the vaporized molecule into the condensed molecule at a collection rate, which is the amount of the vaporized molecule that is condensed into the condensed molecule per unit time,
wherein:
the bombarding increases the vapor pressure of the molecule;
increasing the vapor pressure of the molecule comprises sensible heat transfer from the gas phase to the composition;
the sensible heat transfer has a rate;
the bombarding increases the rate of the sensible heat transfer;
the sensible heat transfer from the gas phase to the composition is completed in less than 60 seconds;
the bombarding transfers at least 10 microjoules of kinetic energy to the composition per gram of the composition;
the composition has a surface-area-to-volume ratio that is greater than 500 per meter;
the surface-area-to-volume ratio of the composition results in a mass transfer rate of at least 5 micrograms of the molecule per gram of the composition per second at the temperature and the pressure of the gas phase;
the composition off-gasses the vaporized molecule at a vaporization rate;
a greater surface-area-to-volume ratio correlates with a greater vaporization rate;
providing the composition comprises preparing the composition from a starting composition;
the starting composition has a surface-area-to-volume ratio that is less than the surface-area-to-volume ratio of the composition;
the processing comprises one or both of increasing the surface-area-to-volume ratio of the starting composition and selecting a portion of the starting composition that has a greater surface-area-to-volume ratio than the rest of the starting composition;
the method comprises condensing the vaporized molecule into the condensed molecule from a first portion of the composition in the second chamber and concurrently converting the molecule into the vaporized molecule from a subsequent portion of the composition in the first chamber;
the method is performed such that the collection rate is at least 50 percent and no greater than 100 percent of the mass transfer rate over a period of time;
the mass transfer rate is at least 50 percent and no greater than 100 percent of the feed rate over a concurrent period of time; and
the period of time and the concurrent period of time are the same 10 second period.

5. The method of claim 1, comprising:
feeding the composition into the first chamber of the system at a feed rate, which is the amount of the molecule that is fed into the first chamber per unit time;
bombarding the composition with at least 10 sextillion molecules of a sweep gas per gram of the composition;
converting the molecule into the vaporized molecule at a mass transfer rate, which is the amount of the molecule that the composition off-gases minus the amount of the vaporized molecule that recondenses onto the composition per unit time; and condensing the vaporized molecule into the condensed molecule at a collection rate, which is the amount of the vaporized molecule that is condensed into the condensed molecule per unit time, wherein:

the bombarding increases the vapor pressure of the molecule;

increasing the vapor pressure of the molecule comprises latent heat transfer from the gas phase to the composition;

the latent heat transfer has a rate;

the bombarding increases the rate of the latent heat transfer;

the latent heat transfer from the gas phase to the composition is completed in less than 60 seconds;

the bombarding transfers at least 10 microjoules of kinetic energy to the composition per gram of the composition;

the composition has a surface-area-to-volume ratio that is greater than 500 per meter;

the surface-area-to-volume ratio of the composition results in a mass transfer rate of at least 5 micrograms of the molecule per gram of the composition per second at the temperature and the pressure of the gas phase;

the composition off-gasses the vaporized molecule at a vaporization rate;

a greater surface-area-to-volume ratio correlates with a greater vaporization rate;

providing the composition comprises preparing the composition from a starting composition;

the starting composition has a surface-area-to-volume ratio that is less than the surface-area-to-volume ratio of the composition;

the processing comprises one or both of increasing the surface-area-to-volume ratio of the starting composition and selecting a portion of the starting composition that has a greater surface-area-to-volume ratio than the rest of the starting composition;

the method comprises condensing the vaporized molecule into the condensed molecule from a first portion of the composition in the second chamber and concurrently converting the molecule into the vaporized molecule from a subsequent portion of the composition in the first chamber;

the method is performed such that the collection rate is at least 50 percent and no greater than 100 percent of the mass transfer rate over a period of time;

the mass transfer rate is at least 50 percent and no greater than 100 percent of the feed rate over a concurrent period of time; and the period of time and the concurrent period of time are the same 10 second period.

6. The method of claim 1, wherein:

the composition comprises the accessory molecule at a concentration of no greater than 20 percent by mass;

the method comprises generating sufficient pressure within the biological cells to rupture at least 75 percent of the cell membranes; and the method comprises vaporizing the accessory molecule and rupturing the cell membranes in a total time of no greater than 60 seconds.

7. The method of claim 1, comprising:

feeding the composition into the first chamber of the system at a feed rate, which is the amount of the molecule that is fed into the first chamber per unit time;

converting the molecule into the vaporized molecule at a mass transfer rate, which is the amount of the molecule that the composition off-gases minus the amount of the vaporized molecule that recondenses onto the composition per unit time; and condensing the vaporized molecule into the condensed molecule at a collection rate, which is the amount of the vaporized molecule that is condensed into the condensed molecule per unit time, wherein:

the method comprises condensing the vaporized molecule into the condensed molecule from a first portion of the composition in the second chamber and concurrently converting the molecule into the vaporized molecule from a subsequent portion of the composition in the first chamber;

the method is performed such that the collection rate is at least 50 percent and no greater than 100 percent of the mass transfer rate over a period of time;

the mass transfer rate is at least 50 percent and no greater than 100 percent of the feed rate over a concurrent period of time; and the period of time is chronologically identical to the concurrent period of time.

8. The method of claim 1, comprising:

feeding the composition into the first chamber of the system at a feed rate, which is the amount of the molecule that is fed into the first chamber per unit time;

converting the molecule into the vaporized molecule at a mass transfer rate, which is the amount of the molecule that the composition off-gases minus the amount of the vaporized molecule that recondenses onto the composition per unit time; and condensing the vaporized molecule into the condensed molecule at a collection rate, which is the amount of the vaporized molecule that is condensed into the condensed molecule per unit time, wherein:

the method comprises condensing the vaporized molecule into the condensed molecule from a first portion of the composition in the second chamber and concurrently converting the molecule into the vaporized molecule from a subsequent portion of the composition in the first chamber;

the method is performed such that the collection rate is at least 50 percent and no greater than 100 percent of the mass transfer rate over a period of time;

the mass transfer rate is at least 50 percent and no greater than 100 percent of the feed rate over a concurrent period of time; and the period of time and the concurrent period of time are the same 1 second period.

9. The method of claim 1, comprising bombarding the composition with at least 10 sextillion molecules of a sweep gas per gram of the composition, wherein:

the vaporized molecule has a partial pressure in the gas phase;

the partial pressure of the vaporized molecule in the gas phase inversely correlates with distance from the composition;

the inverse correlation has a correlation coefficient of at least −1 and less than 0, wherein −1 is complete inverse correlation and 0 is no correlation;

the correlation coefficient has an absolute value; and the bombarding decreases the absolute value of the correlation coefficient.

10. The method of claim 1, comprising bombarding the composition with at least 10 sextillion molecules of a sweep gas per gram of the composition, wherein:

the bombarding increases the vapor pressure of the molecule;
increasing the vapor pressure of the molecule comprises sensible heat transfer from the gas phase to the composition;
the sensible heat transfer has a rate;
the bombarding increases the rate of the sensible heat transfer;
the sensible heat transfer from the gas phase to the composition is completed in less than 60 seconds; and
the bombarding transfers at least 10 microjoules of kinetic energy to the composition per gram of the composition.

11. The method of claim 1, comprising bombarding the composition with at least 10 sextillion molecules of a sweep gas per gram of the composition, wherein:
the bombarding increases the vapor pressure of the molecule;
increasing the vapor pressure of the molecule comprises sensible heat transfer from the gas phase to the composition;
the sensible heat transfer has a rate;
the bombarding increases the rate of the sensible heat transfer; and
the sensible heat transfer from the gas phase to the composition is completed in less than 60 seconds.

12. The method of claim 1, comprising bombarding the composition with at least 10 sextillion molecules of a sweep gas per gram of the composition, wherein:
the bombarding increases the vapor pressure of the molecule;
increasing the vapor pressure of the molecule comprises sensible heat transfer from the gas phase to the composition;
the sensible heat transfer has a rate; and
the bombarding increases the rate of the sensible heat transfer.

13. The method of claim 1, comprising bombarding the composition with at least 10 sextillion molecules of a sweep gas per gram of the composition, wherein:
converting the molecule into the vaporized molecule comprises latent heat transfer between the composition and the gas phase;
the latent heat transfer has a rate;
the bombarding increases the rate of the latent heat transfer;
the latent heat transfer between the composition and the gas phase is completed in less than 60 seconds; and
the bombarding transfers at least 10 microjoules of kinetic energy to the composition per gram of the composition.

14. The method of claim 1, comprising bombarding the composition with at least 10 sextillion molecules of a sweep gas per gram of the composition, wherein:
converting the molecule into the vaporized molecule comprises latent heat transfer between the composition and the gas phase;
the latent heat transfer has a rate;
the bombarding increases the rate of the latent heat transfer; and
the latent heat transfer between the composition and the gas phase is completed in less than 60 seconds.

15. The method of claim 1, comprising bombarding the composition with at least 10 sextillion molecules of a sweep gas per gram of the composition, wherein:
converting the molecule into the vaporized molecule comprises latent heat transfer between the composition and the gas phase;
the latent heat transfer has a rate; and
the bombarding increases the rate of the latent heat transfer.

16. The method of claim 1, wherein:
the composition off-gasses the vaporized molecule at a vaporization rate;
the vaporized molecule recondenses onto the composition at a condensation rate;
converting the molecule into the vaporized molecule occurs at a mass transfer rate, which is equal to the vaporization rate minus the condensation rate;
the composition has a surface-area-to-volume ratio that is greater than 500 per meter;
the surface-area-to-volume ratio of the composition results in a mass transfer rate of at least 5 micrograms of the molecule per gram of the composition per second at the temperature and the pressure of the gas phase;
the composition off-gasses the vaporized molecule at a vaporization rate;
a greater surface-area-to-volume ratio correlates with a greater vaporization rate;
providing the composition comprises preparing the composition from a starting composition;
the starting composition has a surface-area-to-volume ratio that is less than the surface-area-to-volume ratio of the composition; and
the processing comprises one or both of increasing the surface-area-to-volume ratio of the starting composition and selecting a portion of the starting composition that has a greater surface-area-to-volume ratio than the rest of the starting composition.

17. The method of claim 1, comprising generating sufficient pressure within the biological cells to rupture at least 75 percent of the cell membranes.

18. The method of claim 1, wherein the composition comprises the accessory molecule at a concentration of no greater than 20 percent by mass.

19. The method of claim 1, comprising vaporizing the accessory molecule and rupturing the cell membranes in a total time of no gre